US008656956B2

(12) United States Patent
Eijkelenberg et al.

(10) Patent No.: US 8,656,956 B2
(45) Date of Patent: Feb. 25, 2014

(54) REMOTE ACTUATION OF SAFETY DEVICE

(75) Inventors: Tom Eijkelenberg, Westerlo (BE); Guy Jakus, Zemst (BE); Guido Dom, Olen (BE)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 13/438,533

(22) Filed: Apr. 3, 2012

(65) Prior Publication Data
US 2013/0255792 A1 Oct. 3, 2013

(51) Int. Cl.
*F16K 11/16* (2006.01)
*E04H 14/00* (2006.01)

(52) U.S. Cl.
USPC .......................... 137/630.22; 52/1

(58) Field of Classification Search
USPC ............... 137/630.22, 630.19, 628; 52/1, 98
See application file for complete search history.

(56) References Cited

U.S. PATENT DOCUMENTS

| 3,788,514 | A | 1/1974 | Giacoma, Jr. et al. |
| 4,278,181 | A | 7/1981 | Wood et al. |
| 4,299,255 | A | 11/1981 | Miller |
| 4,310,012 | A | 1/1982 | Billington et al. |
| 4,342,988 | A | 8/1982 | Thompson et al. |
| 4,480,811 | A | 11/1984 | Card et al. |
| 4,523,609 | A | 6/1985 | Weck |
| 4,595,374 | A | 6/1986 | Wass |
| 4,657,222 | A | 4/1987 | Tullio |
| 4,811,752 | A * | 3/1989 | Lyons et al. ................ 137/77 |
| 5,291,918 | A | 3/1994 | Johnson |
| 5,461,831 | A | 10/1995 | Michal |
| 5,788,212 | A | 8/1998 | Hackman et al. |
| 6,216,719 | B1 | 4/2001 | Meyer |
| 6,783,114 | B2 | 8/2004 | Sandhu et al. |
| 7,334,773 | B2 | 2/2008 | Stout et al. |
| 7,556,063 | B2 * | 7/2009 | Eijkelenberg et al. ........ 137/797 |
| 7,814,924 | B2 | 10/2010 | McGill |
| 2004/0113116 | A1 | 6/2004 | London et al. |
| 2008/0041454 | A1 * | 2/2008 | Eijkelenberg et al. ..... 137/68.23 |
| 2009/0000406 | A1 | 1/2009 | Brazier et al. |

OTHER PUBLICATIONS

The International Search Report and Written Opinion dated Jun. 28, 2013 in the corresponding PCT/US2013/035126 application dated Apr. 3, 2013.

* cited by examiner

*Primary Examiner* — John Rivell
*Assistant Examiner* — Michael R Reid
(74) *Attorney, Agent, or Firm* — Hovey Williams LLP (57) ABSTRACT

Two-stage, sequential operation protective assemblies are provided, including a primary protective device (20) having an element (32) which shifts in response to operation thereof (preferably a rupturable burst member (35)), together with a secondary protective device (22). An actuating assembly (24) interconnects the primary and secondary protective devices (20, 22) and has an actuating cable assembly (28) preferably including a cable (94) and a frangible component (86). In certain embodiments, an operator (28) for the secondary device (22) may be provided which includes an actuator (106) carried by the cable (94). Upon operation of the primary protective device (20), the cable (94) and frangible component (86) are tensioned and translated in a first direction. The component (86) then severs, which causes operation of the secondary protective device (22).

30 Claims, 10 Drawing Sheets

REMOTE ACTUATION OF SAFETY DEVICE

BACKGROUND OF THE INVENTION

1. Field of the Invention

The present invention is broadly concerned with methods and apparatus which provide a two-stage protective function through use of primary and secondary protective devices interconnected by means of an actuating assembly so that the secondary protective device operates in response to operation of the primary device. More particularly, the invention is concerned with such methods and apparatus which preferably make use of a primary protective device including a rupturable element (e.g., a panel or disc) responsive to untoward pressure conditions in a protected building or other structure. The actuating assembly is preferably entirely mechanical and is responsive to element rupture via an elongated cable assembly which effects operation of a secondary protective device upon rupture of the element.

2. Description of the Prior Art

A wide variety of protective devices have been employed in the past to protect buildings, manufacturing facilities, tanks, chambers, and other structures. These devices are intended to quickly terminate or interrupt potentially destructive phenomena, such as conditions conducive to explosions or fires. Additionally, two-stage protective assemblies have been provided wherein a primary protective device operates and, as a result thereof, a secondary protective device is also operated.

For example, U.S. Pat. No. 7,814,924 describes a safety valve actuator for shutting off a gas line when triggered by a seismic event. The actuator includes a housing containing a number of elements which are put into motion to mechanically close a gas valve when an inertial ball is jolted from a pedestal during an earthquake or the like. U.S. Pat. Nos. 6,216,719 and 4,310,012 are directed to protective devices for fluid delivery hoses. These disclosures provide protective assemblies such that if a hose is inadvertently disconnected or severed during use, the forces generated thereby mechanically actuate a shutoff valve.

U.S. Pat. No. 4,299,255 and U.S. Patent Publication No. 2004/0113116 related to manual remote safety valve actuators for emergency shutoff of fluid lines. The '255 patent provides a rotatable cable connected to a remote casing and stopper. The casing is engageable by a crank which causes the cable to rotate so that the stopper is either extended or withdrawn, depending upon the direction of rotation of the crank. The '116 publication describes a remote valve actuator which transmits rotational motion to a remote valve, and includes a continuous-loop drive cable connected to a drive wheel and a driven wheel. The drive wheel is engageable by a crank which, when rotated, drives the cable and causes the driven wheel to rotate. The driven wheel is connected to a valve which is opened or close depending upon the direction of rotation of the driven wheel.

Other references of background interest include U.S. Pat. Nos. 3,788,514, 4,310,012, 4,480,811, 4,523,609, 4,595,374, 4,657,222, 5,461,831, 5,788,212, 6,783,114, and 7,334,773.

While the art discloses the general concept of sequentially operating primary and secondary protective devices using a mechanical linkage, a number of problems remain. First, the art does not recognize the desirability of employing a rupturable burst assembly as a part of the primary protective device and using the explosive forces generated during operation thereof to activate a secondary protective device. Second, the protective assemblies of the prior art are characterized by complex design requiring frequent maintenance and upkeep.

SUMMARY OF THE INVENTION

The present invention overcomes the problems outlined above and provides protective assemblies which preferably (although not necessarily) make use of a primary protective device having a rupturable burst element, with the energy generated during operation thereof harnessed to effect operation of a secondary protective device.

A protective assembly in accordance with the invention comprises a primary protective device and a secondary protective device which are mated for sequential operation thereof, such that operation of the primary device initiates operation of the secondary device. In general, the primary protective device has an element which shifts upon operation thereof, and an elongated actuated cable assembly is operably coupled between the shiftable element and the secondary device in order to trigger operation of the latter.

In one aspect of the invention, a primary protective device is provided including a rupturable burst element operable to cover a relief opening and rupturable in the event of untoward pressure conditions adjacent the relief opening. A secondary protective device, which in certain embodiments is of a different type or construction than the primary protective device is also provided. In particular embodiments, the secondary protective device may be outfitted with a trigger operable to effect a secondary protection operation; the trigger may be mechanical, such as a slide switch, electromechanical, or electrical. An actuating assembly operably couples the primary and secondary protective devices, and generally includes a fixture assembly operably coupled with the burst element and including a component shiftable in response to the rupture of the burst element. The actuating assembly may also optionally comprise an operator spaced from the primary protective device and coupled with the secondary protective device for operating the trigger. An elongated actuating cable assembly interconnects the fixture assembly and the secondary protective device or operator to effect operation thereof upon rupture of the burst element.

In preferred forms, the fixture assembly component comprises a bracket secured to the burst element and shiftable upon rupture of the burst element. The actuating cable assembly has an elongated cable operably coupled with the bracket so that the cable is initially moved in response to shifting of the bracket, and to sever the cable from the bracket after the initial movement, the cable being secondarily movable upon the severance from the bracket.

The cable assembly preferably has a frangible component operable to sever after the initial movement of the cable, in order to permit the secondary movement of the actuating cable. In certain embodiments, operating structure is associated with the cable, which is loaded during the initial movement of the cable, and which effects the secondary movement of the cable after the severance of the cable from the bracket. The preferred operating structure comprises a spring associated with the cable, which is loaded during the initial translatory movement of the cable in the first direction, and which translates the cable in the second direction after the severance of the cable from the bracket.

In another related aspect of the invention, a two-stage primary-secondary protective assembly includes a primary protective device having an element which shifts upon operation thereof, and an actuating assembly operably coupling the primary and secondary protective devices. An operator for the secondary device includes a trigger to initiate operation thereof, and an elongated actuating cable assembly interconnects the shiftable element and the operator. The actuating cable assembly includes an elongated cable, a frangible component, and an associated spring. The cable assembly is configured so that, upon operation of the primary protective device, the cable is placed in tension and the spring is loaded until the frangible component severs, and so that after the severance of the frangible component, the cable is translated under the influence of the spring to operate the trigger.

In other aspects of the invention, actuating assemblies for interconnecting primary and secondary protective devices are provided along with methods for operating a secondary protective device in response to operation of a primary protective device.

As indicated, the preferred actuating assemblies rely solely upon mechanical components and operations. Thus, no electrical signals are required during operation of the actuating assemblies. Nonetheless, response times are extremely fast and the assemblies can be easily reset after actuation. The overall protective assemblies are characterized by low maintenance, simple operation, and minimal space requirements.

DETAILED DESCRIPTION OF THE PREFERRED EMBODIMENT

Turning now to the drawings, a protective assembly in accordance with the invention broadly includes a primary protective device 20, a secondary protective device 22, and an actuating assembly 24 operably coupling the primary and secondary devices 20, 22 so that the secondary protective device 22 will operate in response to operation of the primary protective device 20. The preferred actuating assembly 24 is purely mechanical and generally has a fixture assembly 26 associated with the primary device 20, an operator 28 designed for coupling with the secondary device 22, and an actuating cable assembly 30 interconnecting the fixture assembly 20 and operator 28. Depending upon the configuration of secondary protective device 22, operator 28 may not be necessary for initiating operation of device 22. Therefore, it is within the scope of the present invention for actuating cable assembly 30 to directly interconnect fixture assembly 26 and secondary protective device 22 without use of operator 28.

Figure 1:
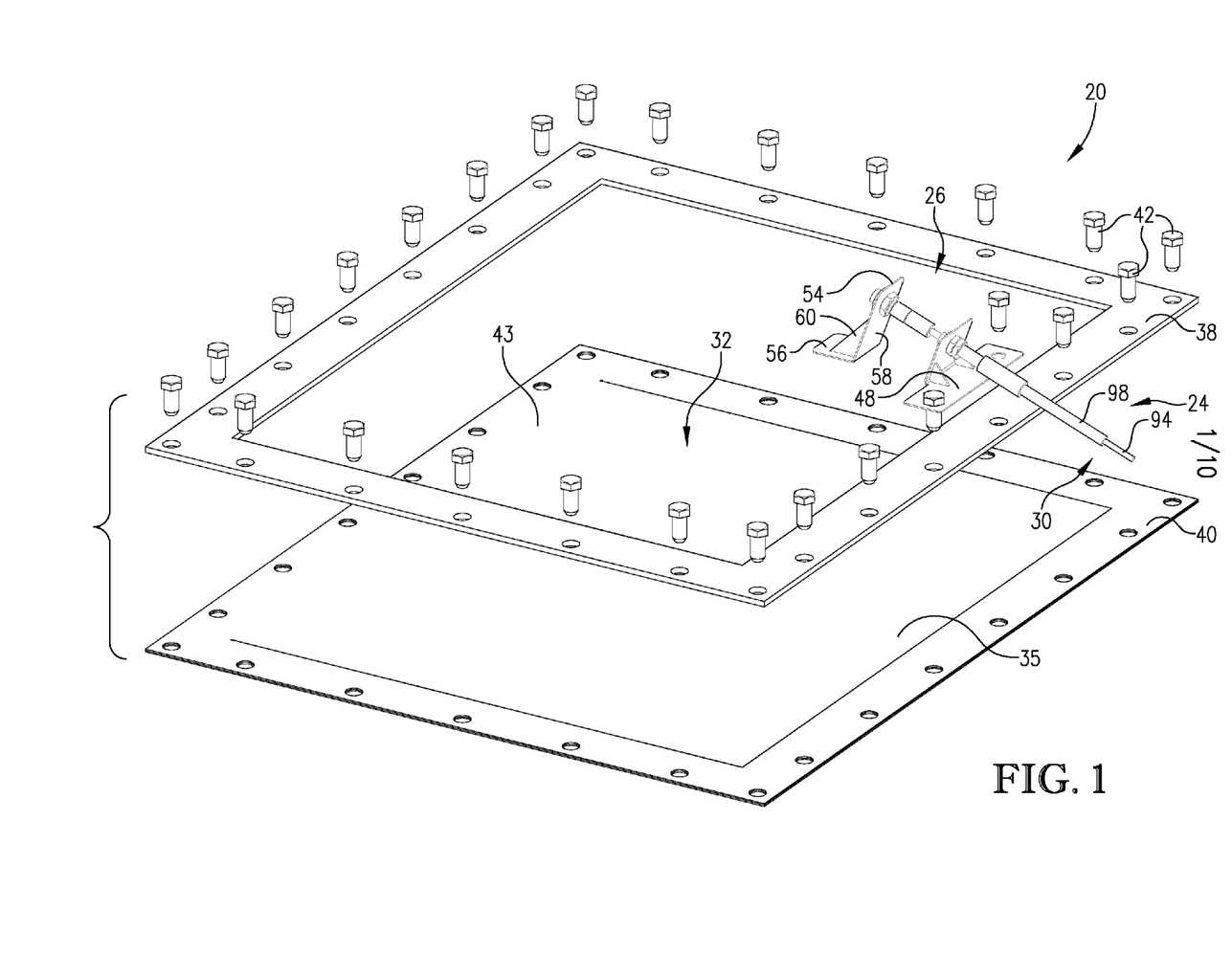
FIG. 1 is a perspective assembly view of the primary overpressure rupture element protective device with an associated actuating cable assembly, forming a part of a protective assembly in accordance with the invention.
Figure 2:
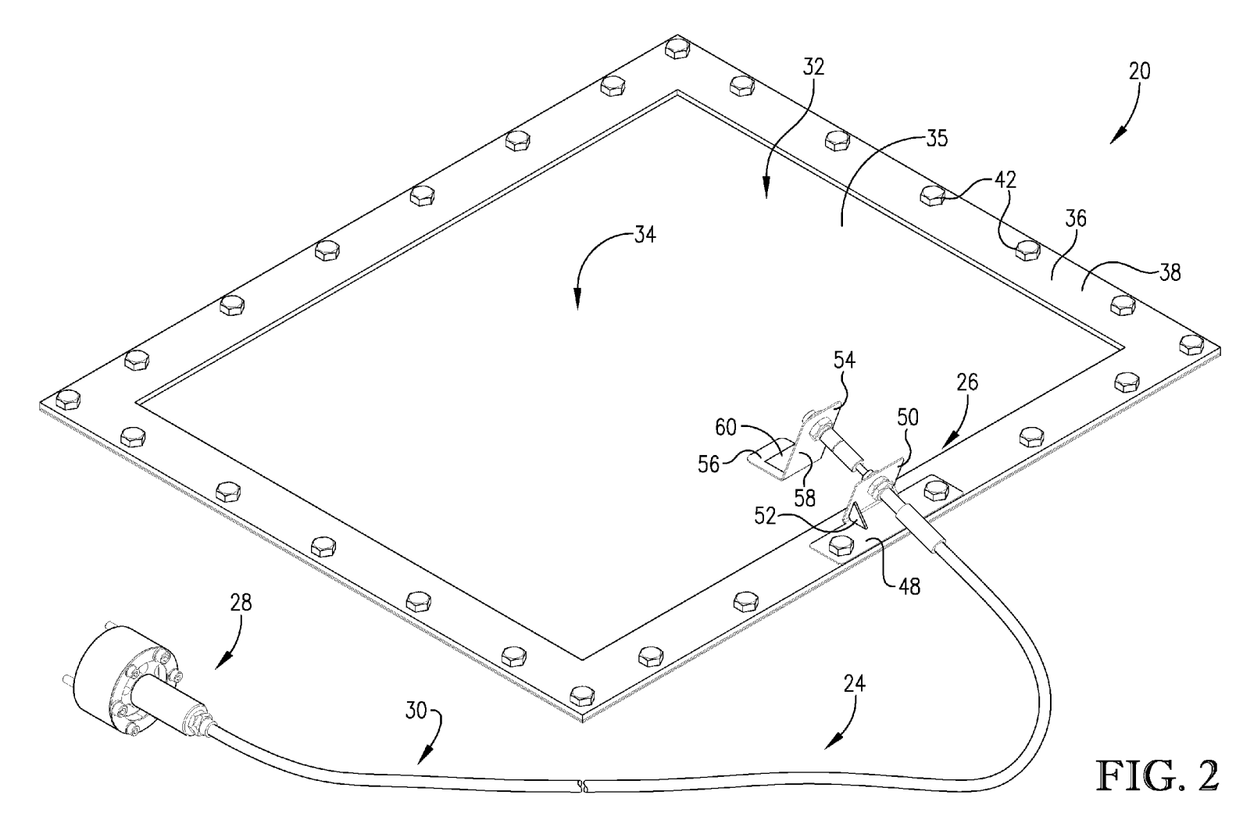
FIG. 2 is a perspective view of the primary protective device, a remote operator for a secondary protective device, with an actuating cable assembly interconnecting the primary protective device and remote operator.
Figure 3:
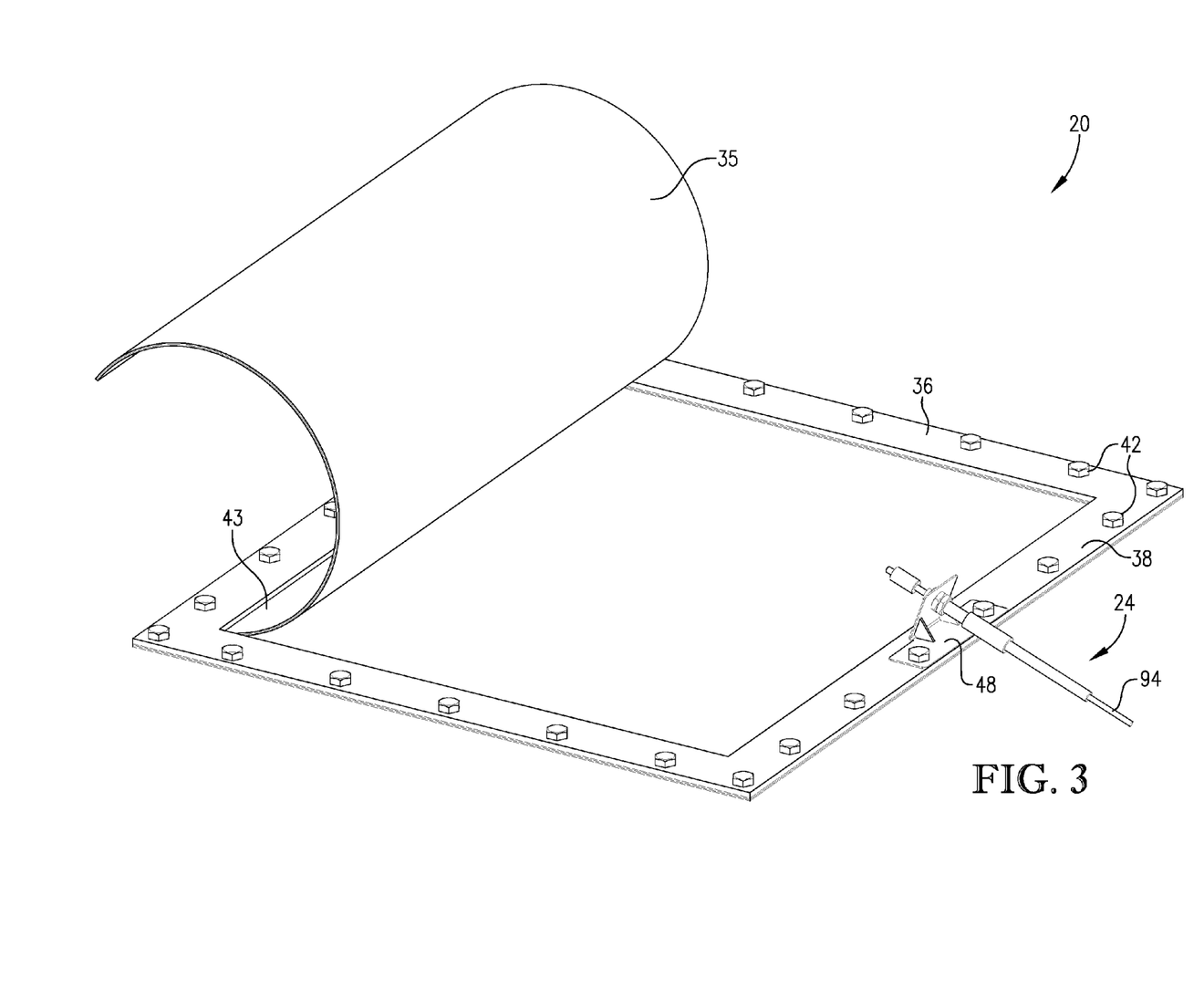
FIG. 3 is a view similar to that of FIG. 2, but illustrating the primary protective device after rupture thereof.

In more detail, the preferred primary protective device 20 has a rupturable burst element 32 operable to cover a relief opening in a building or other structure to be protected, and which is rupturable in the event of untoward pressure conditions (e.g., potentially destructive over- or under-pressures) adjacent the relief opening and burst element. In the illustrated embodiment, the burst element 32 is in the form of a burst panel assembly 34 of quadrate configuration comprising a burstable metallic panel 35 mounted within a peripheral frame 36, the latter made up of upper and lower, apertured frame pieces 38, 40 interconnected by means of threaded fasteners 42. The illustrated panel 35 is designed to initially rupture along the right-hand margin thereof, as viewed in FIGS. 2 and 3, with continued opening of the panel along the illustrated upper and lower margins so that the panel "rolls up" toward the left-hand margin (see FIG. 3) about a hinge section 43. It will be appreciated that the burst panel assembly 34 is schematically depicted, and may be comprise a single element metal vent, a multiple-layer vent panel comprising two outer metal layers and a middle sealing layer (e.g., fluorinated ethylene propylene or polytetrafluoroethylene films), or of the types described, for example, in U.S. Pat. Nos. 6,070,365, 7,556,063, and 7,628,167 (incorporated by herein by reference in their entireties). In addition, the preferred rupturable primary protective devices 20 may be of different shapes or sizes (e.g., circular) and may also be domed or otherwise specially configured, rather than essentially flat, as illustrated in the drawings. In certain alternate embodiments, the primary protective device 20 may be a type of rupture disc, preferably a forward-acting rupture disc.

Figure 12:
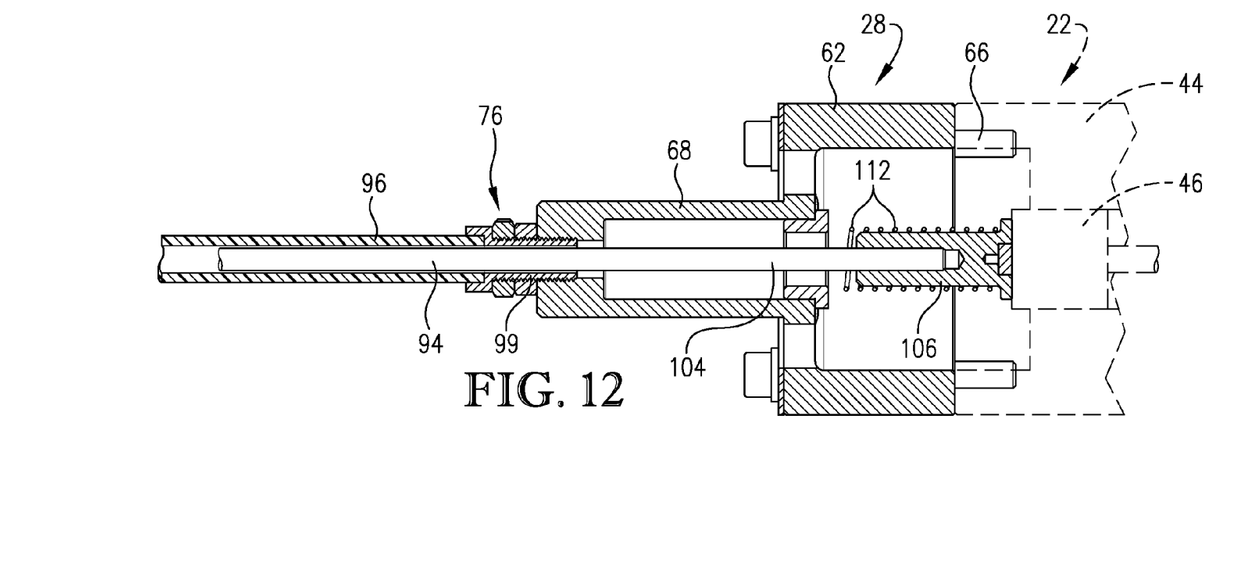
FIG. 12 is a view similar to that of FIG. 10, but depicting the remote operator upon actuation of the secondary protective device.

The secondary protective device 22 (see FIGS. 7, 10, and 12) may be essentially any protective device suitable for the intended use. Exemplary secondary protective devices include isolation valves (e.g., pinch valves or gate valves), and chemical suppressant systems, such as inert gas (e.g., carbon dioxide, argon, nitrogen, halon, and mixtures thereof) suppression systems. Again, the device 22 is only schematically depicted and, is shown as comprising a housing 44 having an optional trigger 46, which is shiftable between a standby position (FIGS. 7 and 10) and an operating position (FIG. 12). Shifting of the trigger 46 from the standby to the operating position serves to actuate the secondary protective device 22. While such a shiftable, mechanical trigger is often preferred, it would also be within the scope of the invention to employ a mechanical-electrical trigger, such as a solenoid, or a stationary trigger which is operated by closing an electrical circuit, or any other suitable arrangement. A further example of how operator 28 may be used to actuate an isolation valve is disclosed in U.S. patent application Ser. No. 13/408,429, filed Feb. 29, 2012, which is incorporated herein by reference in its entirety.

As noted, the actuating assembly 24 is designed to be operably coupled between primary device 20 and secondary device 22, in order to operate the latter in response to operation of the primary device 20. Advantageously, the assembly 24 is entirely mechanical in nature, and does not require any electrical or pneumatic components whatsoever. In this way, the actuating assembly 24 is more reliable and can be readily inspected and repaired as necessary. Further, assembly 24 does not require the presence of sophisticated electronic control systems, thereby reducing the capital costs associated with its installation.

Figure 4:
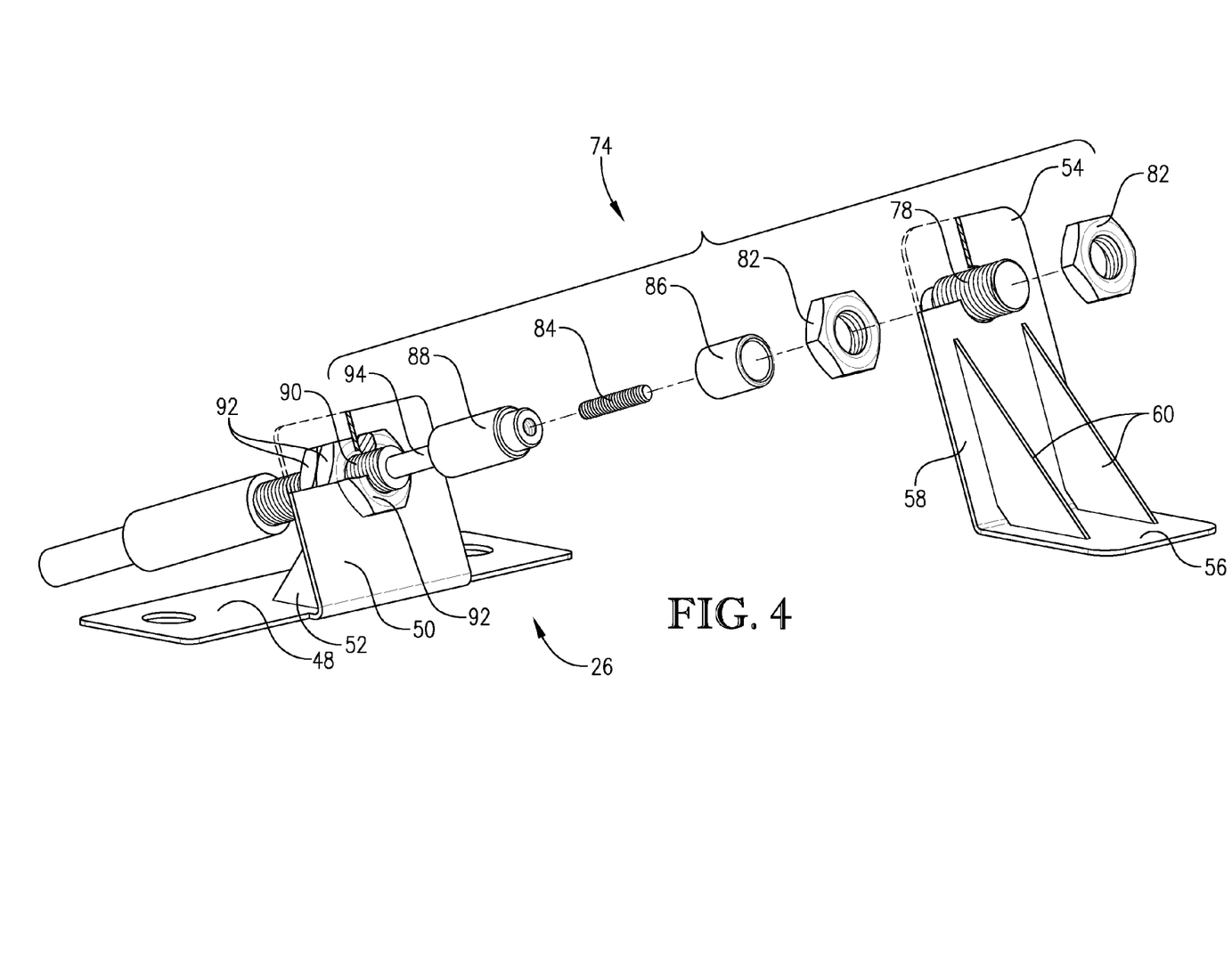
FIG. 4 is an enlarged exploded view with parts broken away of the fixture assembly forming a part of the actuating cable assembly.

The fixture assembly 26 includes a stationary bracket 48 which is secured to frame 36 by fasteners 42 and has an upstanding, apertured plate 50 supported by gussets 52. The assembly 26 further includes a mounting component in the form of a somewhat L-shaped, panel-mounted bracket 54, which is attached, such as through spot-welding, to the upper surface of burst panel 35 and has a base plate 56, an apertured, upstanding plate 58, and reinforcing gussets 60.

The operator 28 (see FIGS. 5 and 7) includes an annular housing 62 having three circumferentially spaced apart through-openings 64 which receive mounting screws 66. An elongated, axially oriented, rearwardly extending spacer bushing 68 is affixed to the housing 62 via webs 63, and is equipped with an inboard washer 70 of generally L-shaped cross-section, and an outboard, internally threaded bore 72. As illustrated, the screws 66 are used to secure the forward annular face of housing 62 to the secondary protective device 22.

The actuating cable assembly 30 includes mounts 74, 76 respectively located adjacent the primary device 20 and secondary device 22. Referring first to the mount 74, it will be seen that it includes an endmost, externally threaded bushing 78 having an internally threaded bore 80 and being secured to the plate 58 of bracket 54 by means of nuts 82. An elongated, externally threaded, frangible rupture rod 84 is threadably received within bore 80 and extends rearwardly therefrom. Rupture rod 84 may be constructed from metal or metal alloy (e.g., copper or aluminum) or a synthetic resin material (e.g., nylon). An annular spacer bushing 86 is disposed about the rearward end of bushing 78 in surrounding relationship to the rupture rod 84. An internally threaded annular cable bushing 88 is received within the rearward end of the spacer bushing 86 and threadably receives the rearward end of rupture rod 84. The overall mount 74 further includes an internally bored, externally threaded, stepped sleeve 90 secured to stationary bracket 48 by means of nuts 92 and extending rearwardly from the bracket 48. An elongated, continuous, cable 94, preferably a formed of metal (e.g., steel, copper, aluminum, etc.) extends through the sleeve 90 and is captively retained by the rearward end of cable bushing 88, such as through a threaded or welded connection. A continuous sheath 96, formed of a synthetic resin material, for example, extends substantially the full length of the cable 94, with the forward end 98 thereof retained within sleeve 90.

The mount 76 (FIG. 7) includes an externally threaded bushing 99 threadably received within bore 72 and is secured in place by means of washer 100 and nut 102. The bushing 99 also has an integral, forwardmost annular retainer section 103. The ends of cable 94 and sheath 96 are received within the bushing 99, with the rearmost end 104 of cable 94 extending into and along the length of the spacer bushing 99, and with the rearmost end of sheath 96 secured within retainer section 103. The end 104 also carries an axially bored actuator 106 having a radially enlarged head 108 and a central, synthetic resin button 110. As shown, the end 104 of cable 94 is received within the bore of actuator 106. A coil compression spring 112 is positioned about the head actuator 106 and is captively retained between head 108 and washer 70.

As explained previously, the protective assemblies of the invention can be used in a variety of contexts. For example, many bag houses and other grain conveying and storage facilities need to be protected against potentially explosive buildups of dust. In such a situation, a rupturable panel-type primary protective device, such as the illustrated device 20, may be positioned in a wall of the grain-handling facility or wall of a vessel located within the facility. This primary protective device may be mated with a secondary device containing having a source of pressurized suppressant gas. The two protective devices work in combination to prevent a catastrophic explosion or fire. In the event of overpressure conditions, the burst panel opens to relieve the pressure and almost instantaneously thereafter the suppressant gas is directed into the protected structure. Of course, this utility is merely exemplary of primary/secondary protective devices contemplated by the present invention.

Figures 5, 6:
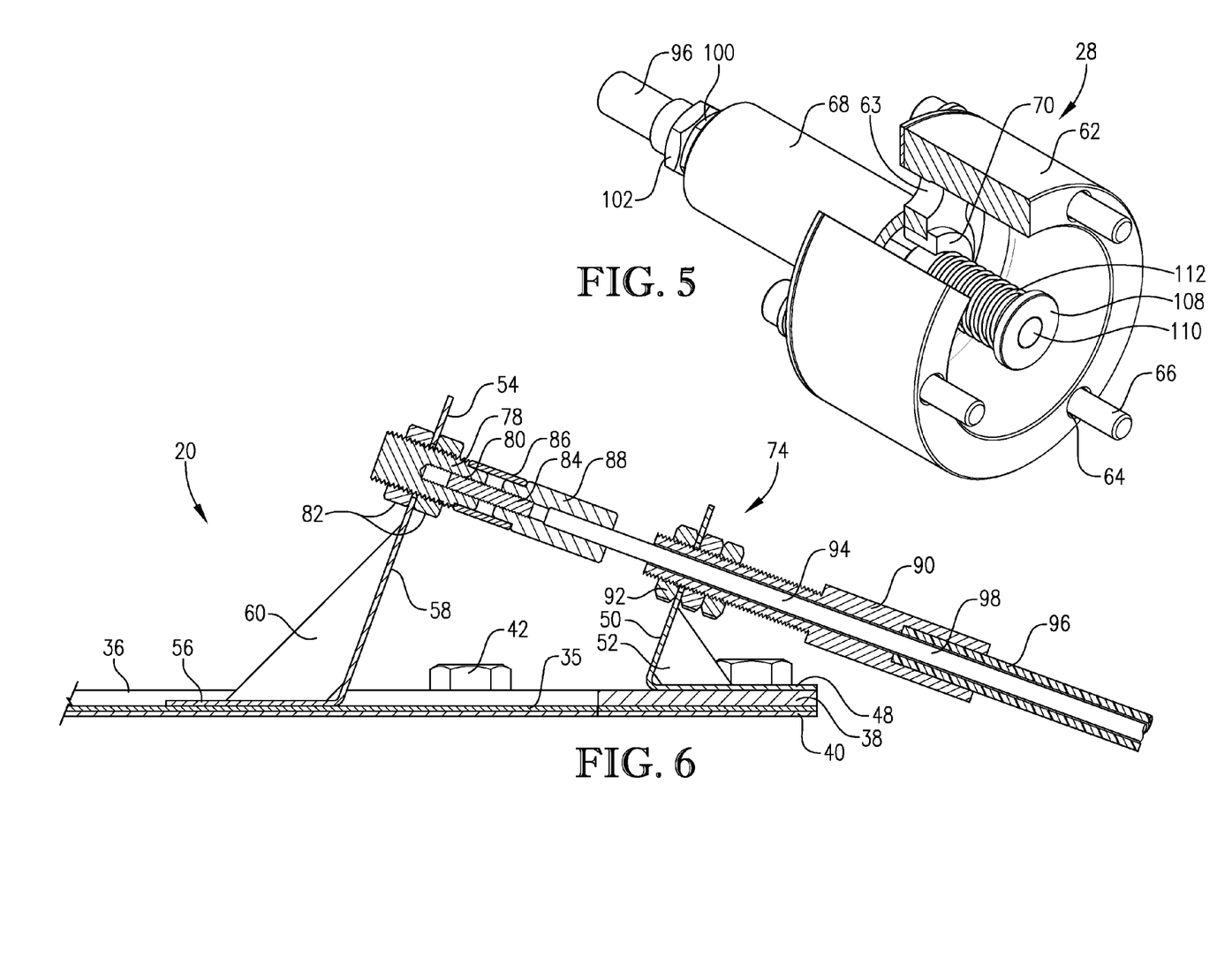
FIG. 5 is an enlarged perspective view of the remote operator, with parts broken away to reveal the internal construction thereof.
FIG. 6 is a fragmentary view in partial vertical section of the primary protective device, and the fixture assembly in its standby condition.
Figures 7, 8:
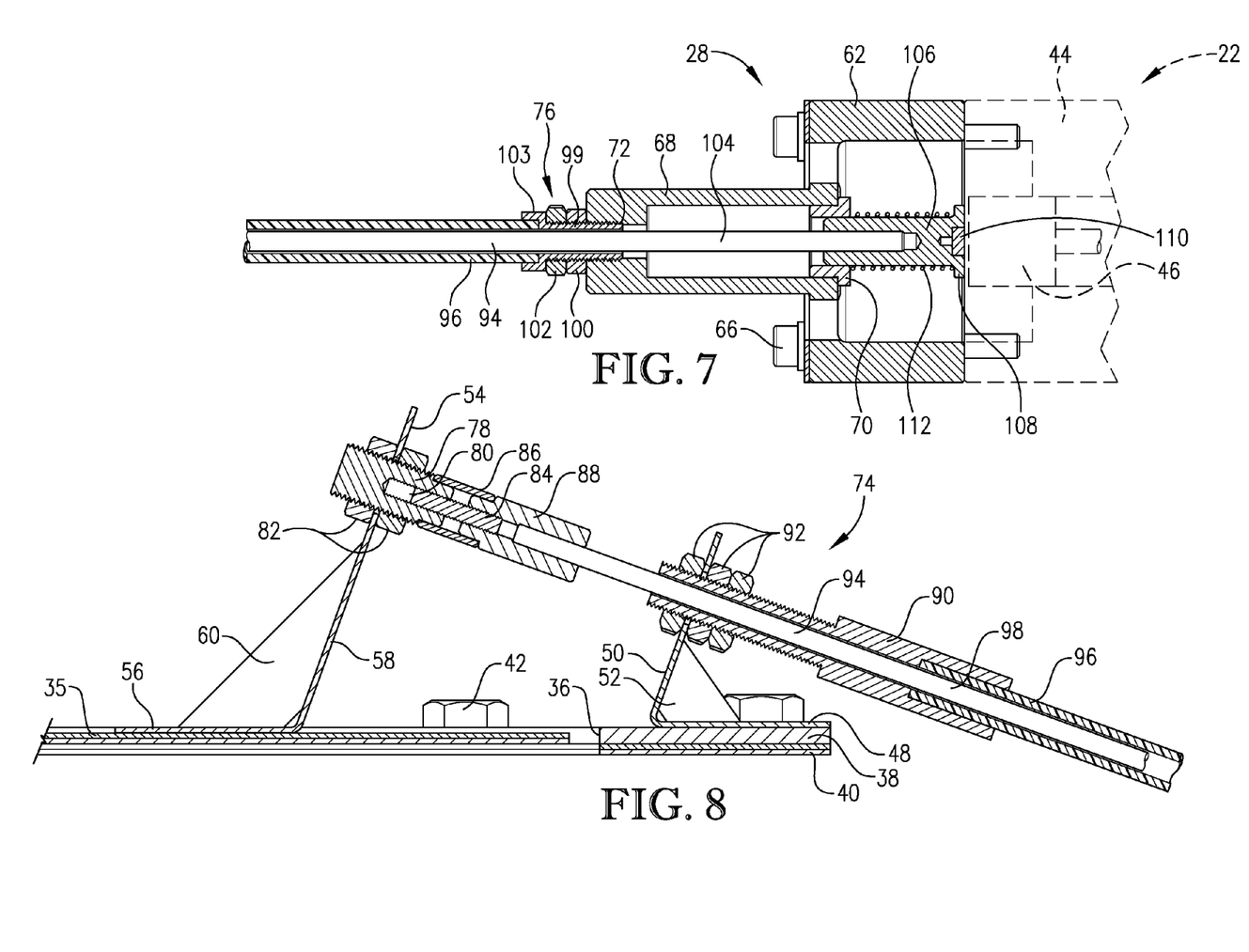
FIG. 7 is a fragmentary view in partial vertical section of the remote operator in its standby condition, with an associated secondary protective device coupled to the remote operator and illustrated in phantom.
FIG. 8 is a view similar to that of FIG. 6, but illustrating the initial stage of operation of the primary protective device.

The operation of the protective devices of the invention can be best understood from a consideration of FIGS. 6-12. Referring first to FIGS. 6 and 7, the primary and secondary protective devices 20, 22 are in their standby conditions. The actuating assembly 24, generally comprising fixture assembly 26, operator 28, and actuating cable assembly 30, is at rest, i.e., the frangible rupture rod 84 and cable 94 are unstressed (FIG. 6), and the actuator 106 is positioned adjacent trigger 46 (FIG. 7).

Figure 10:
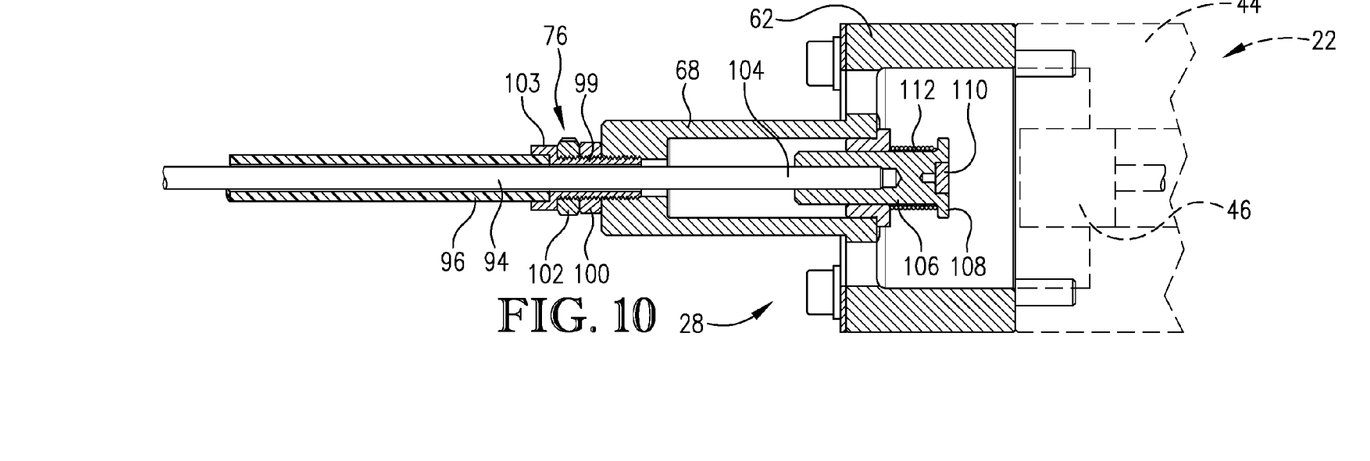
FIG. 10 is a view similar to that of FIG. 7, but illustrating the remote operator in its retracted condition upon opening of the rupture element.

When an overpressure condition at burst panel 35 is experienced, the panel first separates from the frame 36 along the edge thereof adjacent bracket 48 and begins to also elevate and separate from the side margins of the frame (FIG. 8). At this point, the operator 28 remains unaffected. As the burst panel 35 continues to separate from frame 36 and pivot open, the frangible rupture rod 84 and cable 94 are placed in tension and are translated or displaced in a first direction toward the pivoting burst panel 35. As this tensioning and displacement increases, the frangible rupture rod 84 is also subjected to increasing twisting or bending forces as the bracket 54 moves upwardly and leftwardly, as viewed in FIG. 8. As this tensioning and displacement occur, the actuator 106 is also displaced leftwardly, as viewed in FIG. 7, into the bushing 68 (FIG. 10). This serves to load the spring 112, owing to the compression thereof.

Figure 9:
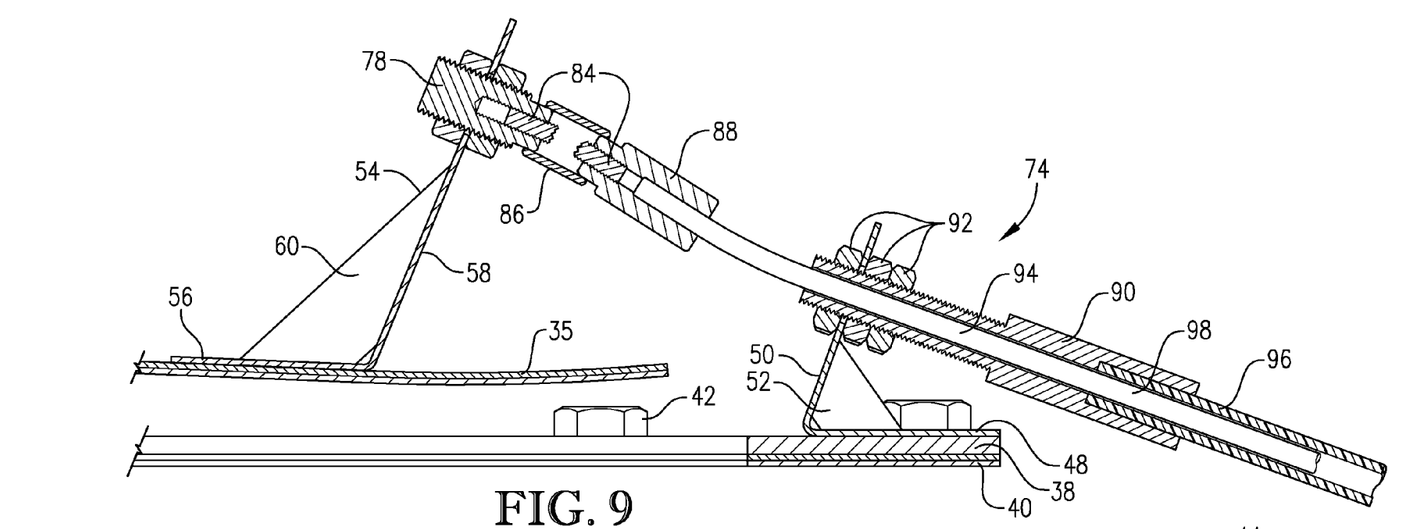
FIG. 9 is a view similar to that of FIG. 8, but illustrating the primary protective device upon opening of the rupture element.
Figure 11:
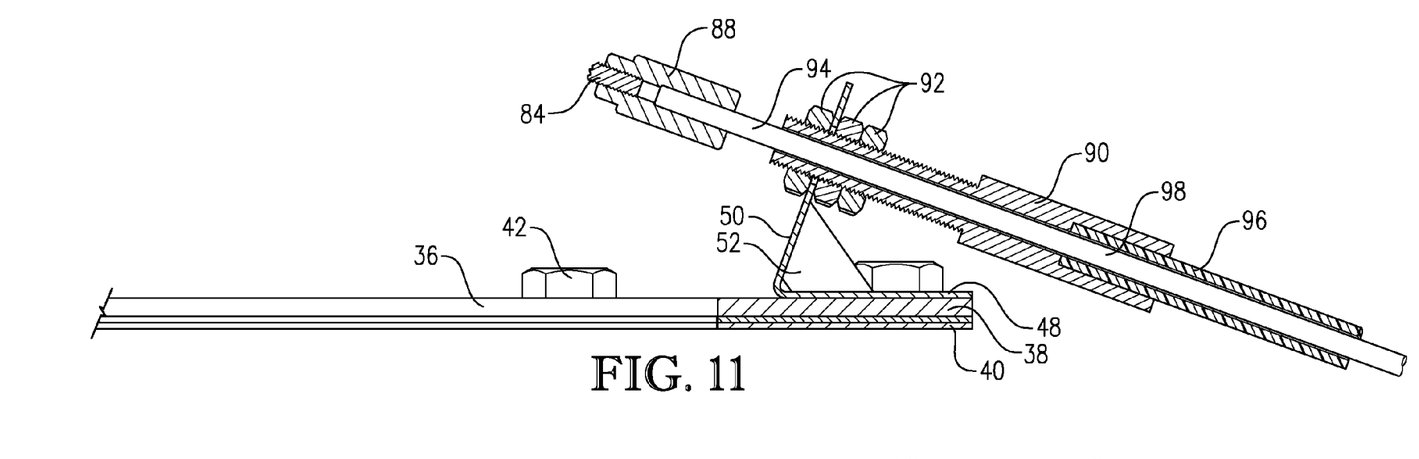
FIG. 11 is a view similar to that of FIG. 9, but illustrating the fixture assembly upon full opening of the rupture element.

This operation, involving tensioning of the cable assembly 30 including rod 84 and cable 94, ultimately causes the rupture rod 84 to break or sever at the region between the bushings 78 and 88 (FIG. 9). Upon such severance, the loaded spring 112 comes into play to propel actuator 106 rearwardly, while also causing a separation of the bushings 78 and 88. It will be appreciated that this action displaces the cable 94 in a second direction away from panel 35. The actuator 106 then engages the trigger 46, serving to shift the trigger and thus initiate operation of the secondary protective device 22 (FIG. 12), with the bushing 88 and a segment of the rod 86 positioned above the vent opening (FIG. 11).

In alternate embodiments, device 22 is a pneumatically operated device such as a pinch valve. Actuator 106 functions as a plug or seal which is shifted against the bias of spring 112 by displacement of cable 94. The shifting of actuator 106 mechanically initiates a flow of gas which in turn operates device 22.

Figure 13:
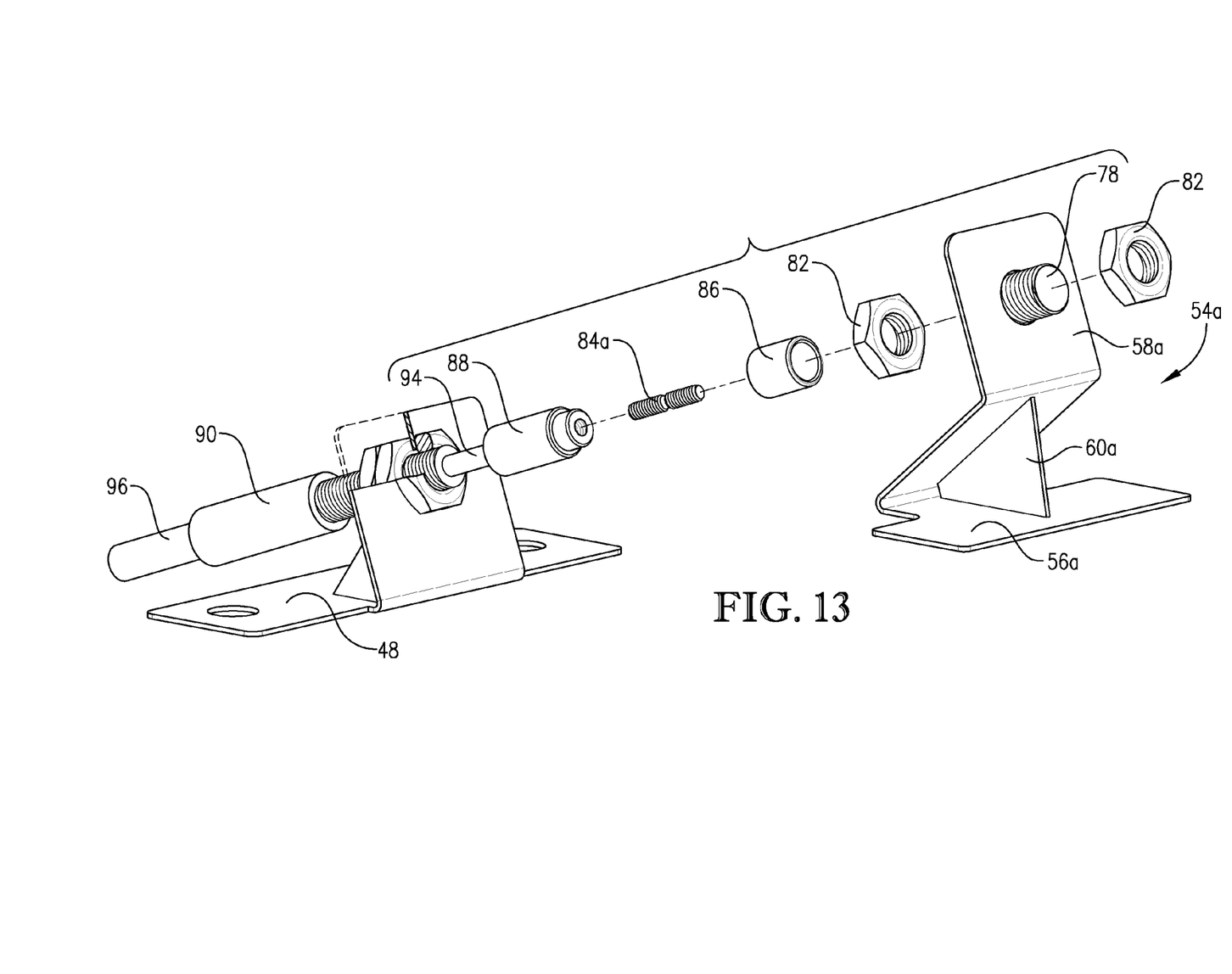
FIG. 13 is an enlarged exploded view with parts broken away of another fixture assembly in accordance with the invention.

Those skilled in the art will appreciate that the invention is susceptible to many variations in terms of the particular components utilized. For example, in the illustrated embodiment, a coil spring is used as operating structure associated with the cable assembly 30 and cable 94, which is loaded during initial movement of the cable, and which effects the secondary movement of the cable after severance of the frangible rod 84. However, other types of springs (e.g., leaf springs and wave springs) may be used in lieu of the illustrated coil spring, and other kinds of non-spring operator structures may also be employed. In like manner, other types of fixture arrangements may be used. As illustrated in FIG. 13, a modified panel-mounted bracket 54a may be used having a base 56a, an apertured, angled mounting plate 58a, and a gusset 60a. As mentioned previously, various primary and secondary protective devices may be used, with the only requisite being that the primary device having an element which shifts upon operation thereof (e.g., a rupturable burst element where a burst panel or disc is employed).

Figure 14:
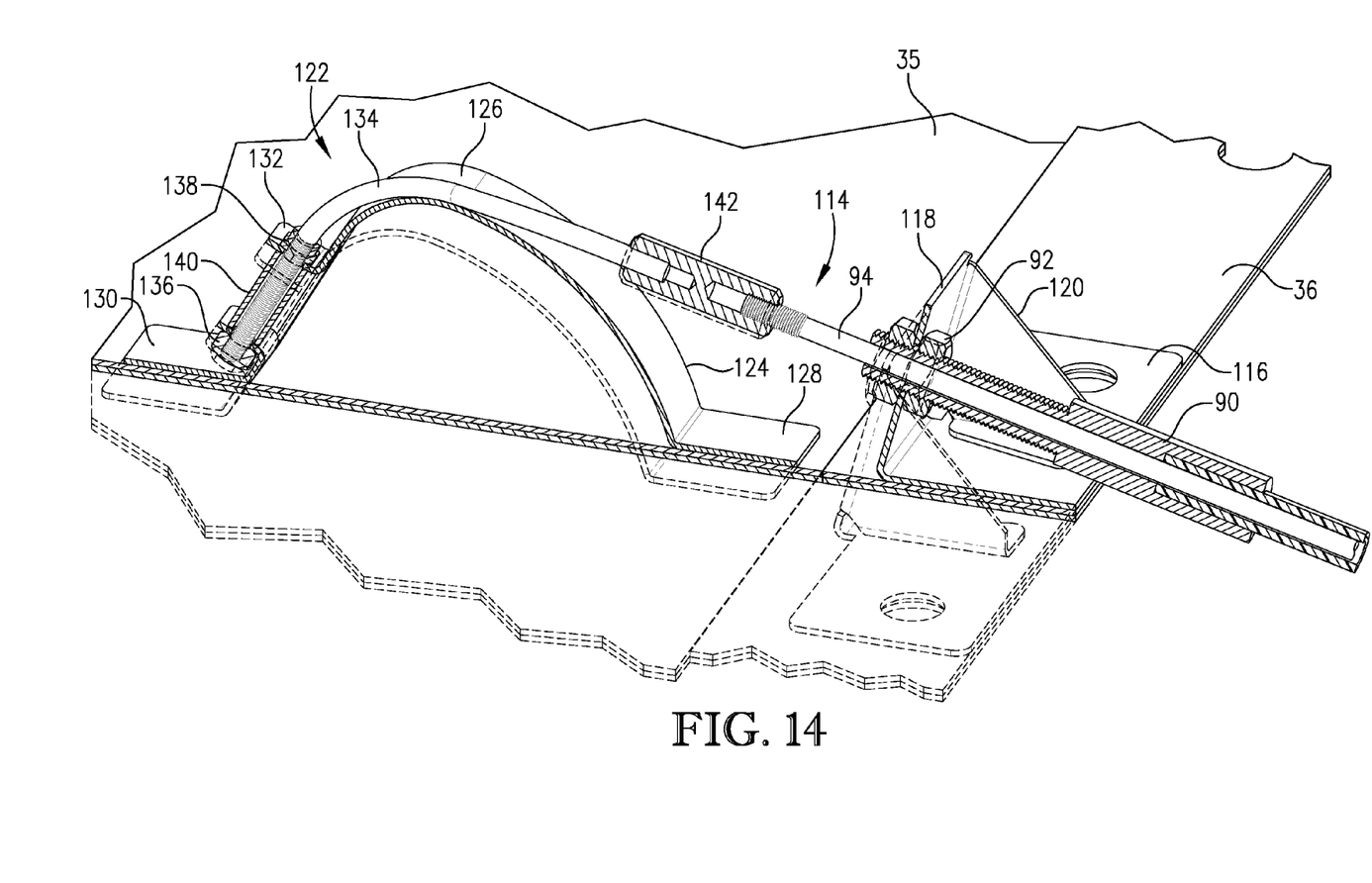
FIG. 14 is a perspective view of an alternate fixture assembly for connecting the actuating cable assembly with the overpressure rupture element protecting device.

FIG. 14 illustrates yet another embodiment of a fixture assembly 114 according to the present invention. The fixture assembly 114 includes a stationary bracket 116 which is secured to frame 36 and has an upstanding, apertured plate 118 supported by a pair of side gussets 120. The assembly 114 further includes a mounting component 122 comprising a panel-mounted bracket 124 having an arched central segment 126 and two flat end segments 128, 130 that are secured directly to burst panel 35, such as through spot-welding. Central segment 126 comprises a plurality of apertured flanges 132 extending transversely therefrom. A threaded rod 134 is inserted through the apertures of flanges 132 and secured thereto by a cap nut 136 and nut 138. Rod 134 is also inserted through a reinforcing sleeve 140 disposed between at least two of flanges 132. Rod 134 and cable 94 are coupled by a connector 142.

Cable 90 is mounted to bracket 116 in a similar manner as described previously. Cable 90 is passed through an internally bored, externally threaded, stepped sleeve 90 secured to stationary bracket 116 by means of nuts 92 and extending rearwardly from the bracket 116. Cable 94 is captively retained by connector 142 by means of a threaded connection (as shown) or welded connection (not shown).

The operation of the embodiment shown in FIG. 14 is very similar to those embodiments described above. However, the mode in which panel 35 is permitted to open independent of cable 94 is somewhat different. Upon rupture and opening of panel 35, the opening forces acting upon rod 134 cause the rod to fail, thereby severing its connection with cable 94. Commonly, rod 134 will fail at or near the apex of arched segment 126, although failure may occur at any point along the length of rod 134.

We claim:

1. A protective assembly comprising:
   a primary protective device including a rupturable burst element operable to cover a relief opening and rupturable in the event of untoward pressure conditions adjacent the relief opening;
   a secondary protective device operable to effect a secondary protection operation; and
   an actuating assembly operably coupled between said burst element and said secondary protective device, said actuating assembly including an elongated actuating cable having a first end that is secured to said burst element and a second end that is coupled with said secondary protective device such that displacement of said burst element in response to rupture thereof effects translatory movement of said actuating cable thereby initiating operation of said secondary protective device.

2. The protective assembly of claim 1, said actuating assembly including:
   a fixture assembly operably coupled with said burst element and including a component shiftable in response to the rupture of said burst element;
   an operator spaced from said primary protective device and coupled with said secondary protective device for operating said secondary protective device; and
   said elongated actuating cable interconnecting said fixture assembly and said operator to effect operation of said secondary protective device upon rupture of said burst element.

3. The protective assembly of claim 2, said fixture assembly component comprising a bracket secured to said burst element and shiftable upon rupture of the burst element, said elongated cable operably coupled with said bracket so that the cable is initially moved in response to shifting of said bracket.

4. The protective assembly of claim 3, said cable assembly including a frangible component operable to sever the cable from said bracket after said initial movement of said cable.

5. The protective assembly of claim 4, said cable being secondarily movable upon said severance from said bracket.

6. The protective assembly of claim 5, including operating structure associated with said cable which is loaded during said initial movement of said cable, and which effects said secondary movement of said cable after said severance of said cable from said bracket.

7. The protective assembly of claim 6, said cable translating in a first direction with said bracket during said initial movement, and translating in said second direction after said severance of said frangible component.

8. The protective assembly of claim 7, said first and second directions being generally opposite and axial along the length of the actuating cable.

9. The protective assembly of claim 7, said operating structure comprising a spring associated with said cable, said spring being loaded during said initial translatory movement of said cable in said first direction, and which translates the cable in said second direction after said severance of said cable from said bracket.

10. The protective assembly of claim 9, said spring being a compression spring which is compressed during said initial translatory movement of said cable in said first direction, and which expands after said severance of said cable from said bracket in order to translate said cable in said second direction.

11. The protective assembly of claim 1, said burst element comprising a burst panel or a rupture disc in covering relationship to said relief opening and operable to rupture in the event of an overpressure adjacent said relief opening.

12. The protective assembly of claim 1, said actuating assembly including an actuator which shifts in response to said rupture of said burst element in order to operate a trigger operably connected to said secondary protective device.

13. The protective assembly of claim 12, said trigger comprising a shiftable mechanism.

14. An actuating assembly operable to interconnect a primary protective device and a secondary protective device in order to operate the secondary protective device in response to operation of the primary protective device, said primary protective device having an element which shifts upon operation thereof, said actuating assembly comprising:
   a mounting component configured for coupling with said element and shiftable with the element during operation of said primary protective device;

an actuating cable assembly comprising an elongated cable, a frangible component, and an associated spring, said actuating cable assembly operable to interconnect said mounting component and said secondary protective device in order to operate the secondary protective device in response to shifting of said mounting component, said actuating cable assembly configured so that, upon operation of said primary protective device, said cable is initially translated in a first direction with said mounting component in order to load said spring until said frangible element severs, and to thereafter translate said cable in a second direction under the influence of said spring to operate the secondary protective device.

15. The actuating assembly of claim 14, said spring being a compression spring which is compressed during said initial translatory movement of said cable in said first direction, and which expands after said severance of said cable from said bracket in order to translate said cable in said second direction.

16. The actuating assembly of claim 14, said primary protective device including a rupturable burst element, said mounting component comprising a bracket configured to be secured to said burst element and shiftable upon rupture of the burst element.

17. The actuating assembly of claim 14, said spring being a coil compression spring which is disposed about said actuating cable.

18. An actuating assembly operable to interconnect a primary protective device and a secondary protective device in order to operate the secondary protective device in response to operation of the primary protective device, said primary protective device having an element which shifts upon operation thereof, said actuating assembly comprising:
a mounting component configured for coupling with said element and shiftable with the element during operation of said primary protective device; and
an elongated actuating cable assembly interconnecting said mounting component and being attachable to said secondary protective device in order to operate the secondary protective device in response to shifting of said mounting component,
said actuating cable assembly including an elongated cable, a frangible component, and an associated spring,
said actuating cable assembly configured so that, upon operation of said primary protective device, said cable is placed in tension and said spring is loaded until said frangible component severs, and so that after severance of said frangible component, said cable is translated under the influence of said spring to operate said secondary protective device.

19. The actuating assembly of claim 18, said primary protective device including a rupturable burst element operable to cover a relief opening and rupturable in the event of untoward pressure conditions adjacent the relief opening, said cable being configured for operative coupling with said burst element.

20. The actuating assembly of claim 19, including a fixture assembly having a bracket configured for operative coupling with said burst element and shiftable in response to the rupture of said burst element, said cable operatively coupled with said bracket.

21. The actuating assembly of claim 18, said spring being a compression spring which is compressed during said tensioning of said cable, and which expands after said severance of said frangible component in order to translate said cable.

22. A method of operating a secondary protective device in response to operation of a primary protective device, said primary protective device having an element which shifts upon operation thereof, said method comprising the steps of:
operably coupling an elongated actuating cable assembly between said shiftable element and said secondary protective device,
said actuating cable assembly including an elongated cable and a frangible component,
said primary protective device including a rupturable burst element, said cable operatively secured to said burst element and shiftable in a first direction upon rupture of the burst element;
upon operation of said primary protective device, initially translating said cable in said first direction until said frangible component severs and thereby causing operation of the secondary protective device.

23. The method of claim 22, said actuating cable assembly further including an associated spring, upon severance of said frangible component, said cable being translated in a second direction under the influence of said spring to operate the secondary protective device.

24. The method of claim 23, said spring being a compression spring which is compressed during said initial translatory movement of said cable in said first direction, and which expands after said severance of said cable from said bracket in order to translate said cable in said second direction.

25. A method of operating a secondary protective device in response to operation of a primary protective device, said primary protective device having an element which shifts upon operation thereof, said method comprising the steps of:
operably coupling an elongated cable assembly between said shiftable element and said secondary protective device,
said actuating cable assembly including an elongated cable, a frangible component, and an associated spring,
upon operation of said primary protective device, initially placing said cable in tension and loading said associated spring until said frangible component severs, and after said severance of said frangible component, translating said cable under the influence of said spring to operate the secondary protective device.

26. The method of claim 25, including the step of translating said cable during said tensioning thereof in a first direction, and, after said severance of said frangible component, translating said cable in a second direction to operate said secondary protective device.

27. The method of claim 25, said spring being a compression spring which is compressed upon tensioning of said cable, and which expands after said severance of said cable in order to operate said secondary protective device.

28. The method of claim 25, said primary protective device including a rupturable burst element, said cable operatively secured to said burst element and shiftable in a first direction upon rupture of the burst element.

29. A protective assembly comprising:
a primary protective device including a rupturable burst element operable to cover a relief opening and rupturable in the event of untoward pressure conditions adjacent the relief opening;
a secondary protective device operable to effect a secondary protection operation; and
an actuating assembly operably coupled between said burst element and said secondary protective device, said actuating assembly operable to initiate operation of said secondary protective device in response to rupture of said burst element, said actuating assembly including a fixture assembly operably coupled with said burst element and including a component shiftable in response to the rupture of said burst element, an operator spaced from said primary protective device and coupled with said secondary protective device for operating said secondary protective device, and an elongated actuating cable assembly interconnecting said fixture assembly and said operator to effect operation of said secondary protective device upon rupture of said burst element, said fixture assembly component comprising a bracket secured to said burst element and shiftable upon rupture of the burst element, said actuating cable assembly including an elongated cable operably coupled with said bracket so that the cable is initially moved in response to shifting of said bracket.

30. A method of operating a secondary protective device in response to operation of a primary protective device, said primary protective device having an element which shifts upon operation thereof, said method comprising the steps of:

operably coupling an elongated actuating cable assembly between said shiftable element and said secondary protective device, said actuating cable assembly including an elongated cable and a frangible component, upon operation of said primary protective device, initially translating said cable in a first direction until said frangible component severs and thereby causing operation of the secondary protective device, said actuating cable assembly further including an associated spring, upon severance of said frangible component, said cable being translated in a second direction under the influence of said spring to operate the secondary protective device.

* * * * *